(12) United States Patent
Pacella et al.

(10) Patent No.: US 10,652,132 B2
(45) Date of Patent: May 12, 2020

(54) DISCOVERY AND ADMISSION CONTROL OF FORWARDING BOXES IN A SOFTWARE-DEFINED NETWORK

(71) Applicant: Verizon Patent and Licensing Inc., Arlington, VA (US)

(72) Inventors: Dante J. Pacella, Charles Town, WV (US); Mani Tadayon, Leesburg, VA (US); Syed A. Ahmad, Ashubrn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

(21) Appl. No.: 15/862,008

(22) Filed: Jan. 4, 2018

(65) Prior Publication Data
US 2018/0131597 A1 May 10, 2018

Related U.S. Application Data

(63) Continuation of application No. 14/674,689, filed on Mar. 31, 2015, now Pat. No. 9,866,468.

(51) Int. Cl.
*H04L 12/751* (2013.01)
*H04L 12/911* (2013.01)
*H04L 12/721* (2013.01)

(52) U.S. Cl.
CPC .............. *H04L 45/02* (2013.01); *H04L 45/70* (2013.01); *H04L 47/70* (2013.01)

(58) Field of Classification Search
None
See application file for complete search history.

(56) References Cited

U.S. PATENT DOCUMENTS

| 9,461,923 | B2 | 10/2016 | Li |
| 2014/0362709 | A1* | 12/2014 | Kashyap ................. H04L 41/12 370/250 |
| 2015/0334001 | A1* | 11/2015 | Sato ..................... H04L 12/6418 370/392 |
| 2015/0365325 | A1 | 12/2015 | Hwang et al. |
| 2019/0372881 | A1* | 12/2019 | Hu .......................... H04L 41/12 |

* cited by examiner

*Primary Examiner* — Younes Naji

(57) ABSTRACT

A controller, in a software-defined networking control layer, may determine auto-discovery parameters and may use the auto-discovery parameters to identify a first set of forwarding boxes within a network. The controller may identify a second set of forwarding boxes within the network that communicate with or are otherwise coupled to the first set of forwarding boxes. The controller may forward requests to the first and second sets of forwarding boxes to control traffic exchanged via the first and second sets of forwarding box. A third set of forwarding boxes located outside the network may request admissions into the software defined network, and requests from the third set of forwarding boxes may be forwarded to the controller via the first or second sets of forwarding boxes. The controller may authenticate the second and the third sets of forwarding boxes based on their relationship to the first set of forwarding boxes.

18 Claims, 10 Drawing Sheets

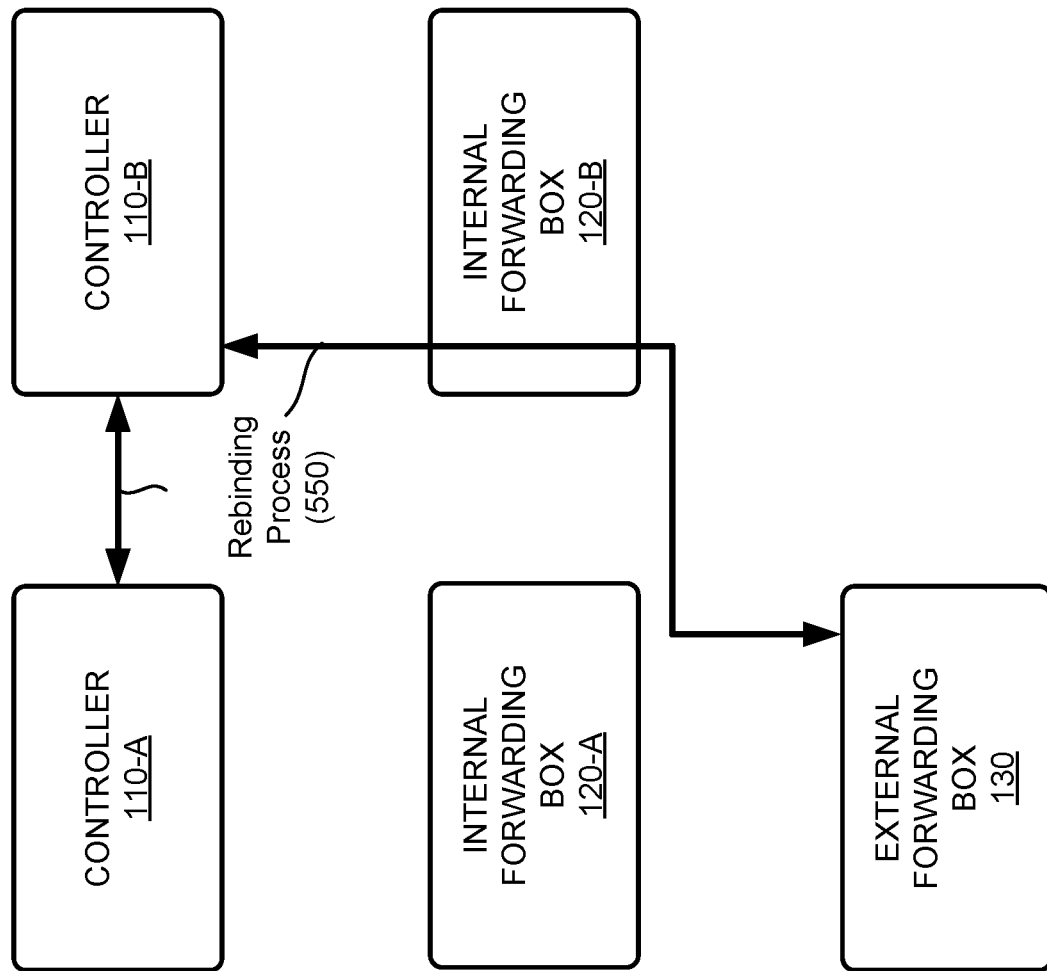

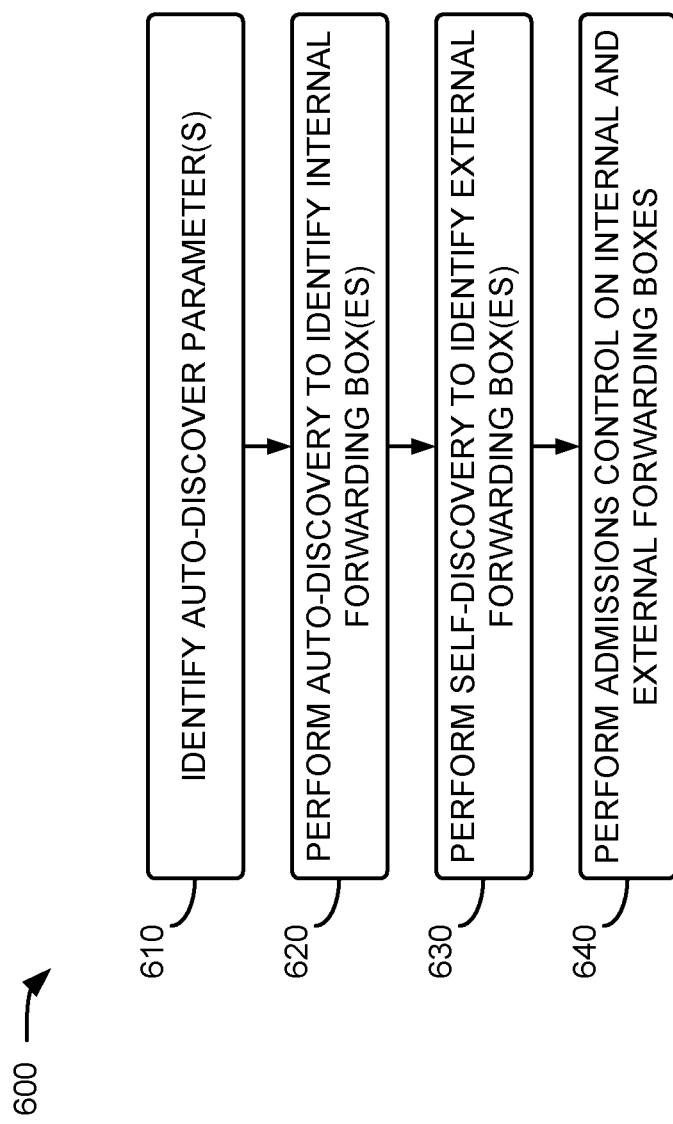

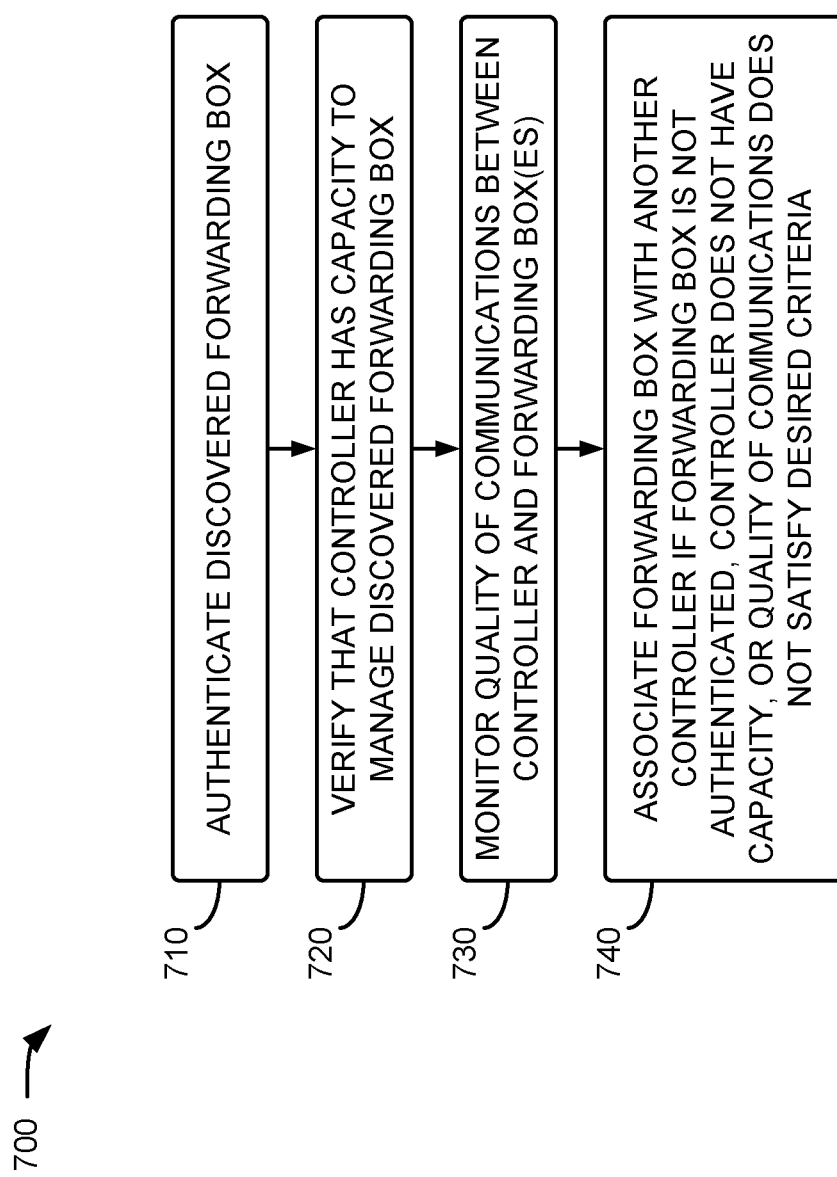

DISCOVERY AND ADMISSION CONTROL OF FORWARDING BOXES IN A SOFTWARE-DEFINED NETWORK

CROSS-REFERENCE TO RELATED APPLICATION

The application is a continuation of U.S. patent application Ser. No. 14/674,689, filed on Mar. 31, 2015, the contents of which are hereby incorporated herein by reference in their entirety.

BACKGROUND

A network device, such as a router or a switch, may use a control plane and a forwarding plane to control and exchange data within a network or between different networks. The control plane may generate and maintain a routing table that lists routes that may be used to forward data. For example, the routing table may include information identifying static routes or routes obtained through a dynamic routing protocol. When data is received by the network device, the forwarding plane may use a forwarding table to identify an available path and may forward the data via the identified path. The forwarding table may include information that associates a flow with the path so that additional data from the flow may also be routed via the same path.

In software-defined networking (SDN), network administrators can manage network services through abstraction of lower-level functionality to separate the control plane from the physical network. In SDN, control plane devices communicate with forwarding plane devices to direct flows, and the control plane devices may dynamically generate instructions for handing network traffic. For example, the instructions may control how network devices route traffic, prioritize different traffic, translate traffic between network protocols, etc.

BRIEF DESCRIPTION OF THE DRAWINGS

FIG. 5A-5D are diagrams of exemplary communications among devices within a portion of the environment illustrated in FIG. 1;

FIG. 6 is a flow diagram of an exemplary process for establishing a software defined network that includes internal forwarding boxes and external forwarding boxes; and FIG. 7 is a flow diagram of an exemplary process for performing admissions control on a discovered forwarding box.

DETAILED DESCRIPTION OF PREFERRED EMBODIMENTS

The following detailed description refers to the accompanying drawings. The same reference numbers in different drawings may identify the same or similar elements.

According to systems and methods described herein, a controller, in a software-defined networking control layer, may determine auto-discovery parameters and may use the auto-discovery parameters to identify a first set of forwarding boxes within a network (such as a service provider network). The controller may further identify a second set of forwarding boxes within the network that communicate with or are otherwise coupled to the first set of forwarding boxes. The controller may forward requests to the identified first and second sets of forwarding boxes to control traffic exchanged via the first and second sets of forwarding box. A third set of forwarding boxes located outside the network may request admissions into the software defined networking, and requests from the third set of forwarding boxes may be forwarded to the controller via the first and/or second sets of forwarding boxes. The controller may authenticate the second and the third sets of forwarding boxes based on their relationship to the first set of forwarding boxes. The controller may further determine whether sufficient bandwidth is available between the controller and members of the first, second, and/or third sets of forwarding boxes to enable control information to be sent from the controller. The controller may further allocate amounts of bandwidth between the controller and members of the first, second, and/or third sets of forwarding boxes. If there is insufficient bandwidth and/or the quality of communications between the controller and members of the first, second, and/or third sets of forwarding boxes does not comply with one or more desired characteristics, the controller may cause one of the forwarding boxes to be reassigned to another controller.

Figure 1:
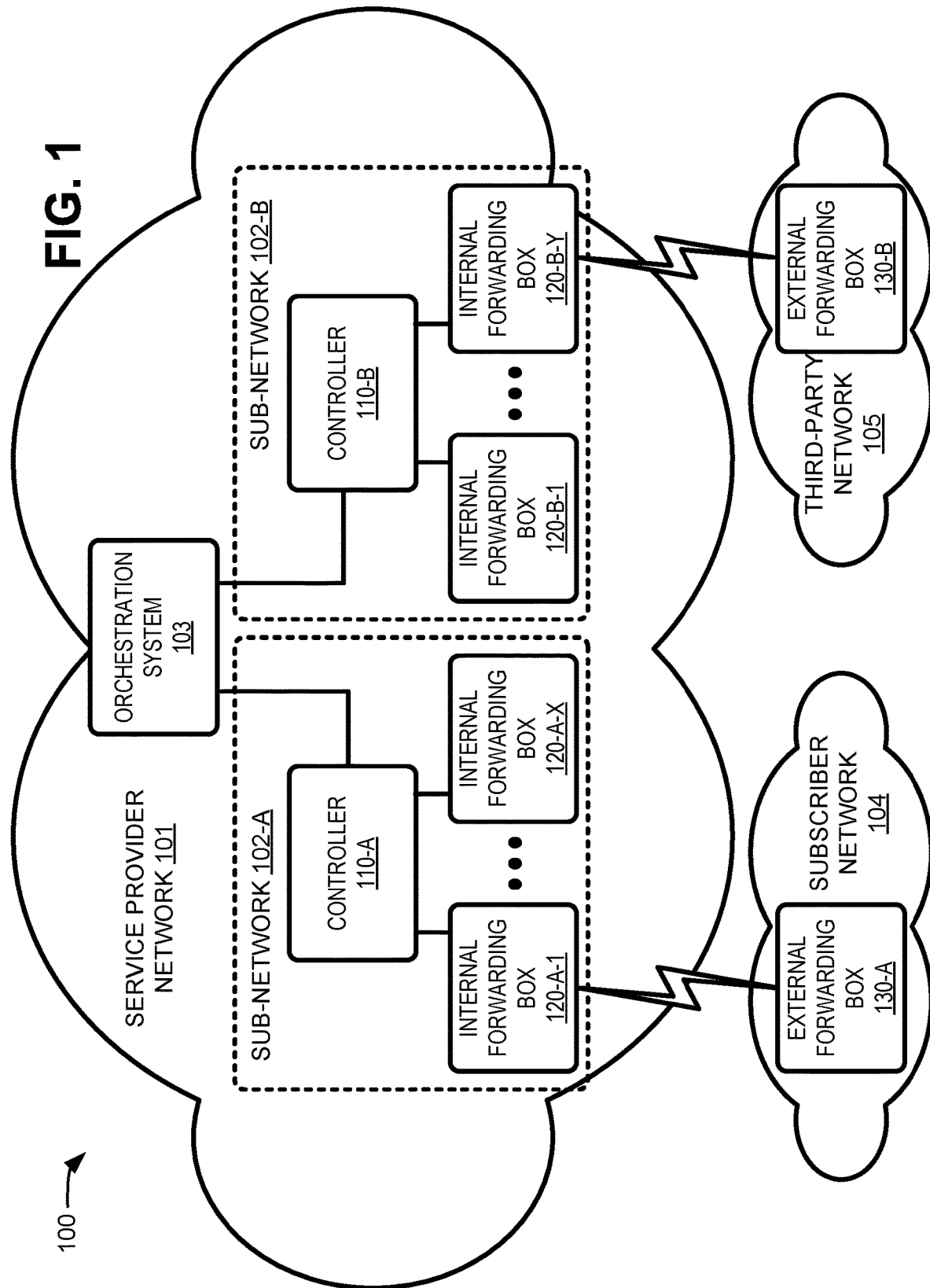
FIG. 1 is a diagram illustrating an exemplary environment in which systems and/or methods described herein may be implemented.

FIG. 1 is a diagram illustrating an exemplary environment 100 in which systems and/or methods described herein may be implemented. As shown in FIG. 1, environment 100 may include (i) a service provider network 101 having one or more sub-networks 102 (shown in FIG. 1 as sub-network 102-A and sub-network 102-B) that each include a controller 110 (shown in FIG. 1 as controller 110-A associated with sub-network 102-A and controller 110-B associated with sub-network 102-B) and internal forwarding boxes 120 (shown as internal forwarding boxes 120-A-1 through 120-A-X associated with controller 110-A and internal forwarding boxes 120-B-1 through 120-B-Y associated with controller 110-B), and an orchestration system 103; and (ii) external forwarding boxes 130 (shown in FIG. 1 as external forwarding box 130-A associated with a subscriber network 104 and external forwarding box 130-B associated with a third-party network 105). In practice, environment 100 may include additional, different, or fewer elements than those illustrated in FIG. 1.

Service provider network 101 may include one or more wired, wireless and/or optical networks for rendering communication services. The networks may be capable of receiving and transmitting data, voice and/or video signals, including multi-media signals. Through various networks in service provider network 101, a device in subscriber network 104 may communicate with other devices (e.g., receive content). For example, service provider network 101 may include a wide area network (WAN), a metropolitan area network (MAN), an ad hoc network, an intranet, a fiber optic-based network, and/or a combination of these or other types of networks. Additionally or alternatively, service provider network 101 may include a cellular network, the Public Land Mobile Network (PLMN), and/or another mobile network. According to implementations described herein, service provider network 101 may employ Software Defined Networking (SDN) tools and conventions, including a separate service orchestration layer, control layer, and resources (or forwarding) layer.

As used herein, sub network 102 may refer to a portion of service provider network 101. The portion includes a controller 110 and one or more internal forwarding boxes 120 that receive control data from the controller 110. For example, controller 110 may manage internal forwarding boxes 120 in a particular location (e.g., internal forwarding boxes 120 in a building, a campus, in a neighborhood, etc.) or connected to a particular communications path or to a particular device, such as an optical networking device, enhanced node B, etc. In another example, controller 110 may manage internal forwarding boxes 120 within a network that provide a particular service or handle a particular type of data (e.g., multimedia data, web data related to a particular domain, voice over internet protocol data, data related to a particular application, etc.).

Controller 110 may include a computing device or network device that provides control plane functionality for a software-defined network, which includes elements of physical networks (e.g., service provider network 101, third-party network 104, and/or subscriber network 105) or devices within the physical networks. Each controller 110 may be included within a control layer of service provider network 101. Controller 110 may include an application that manages flow control to enable intelligent networking. In one implementation, controller 110 may translate commands from an orchestration layer (e.g., orchestration system 103) into a format that can be used by internal forwarding boxes 120 and/or external forwarding boxes 130. For example, controller 110 may communicate with internal forwarding boxes 120, external forwarding boxes 130, and/or other elements of service provider network 101 to manage data flows from one endpoint to another. In one implementation, controller 110 may use existing protocols, such as OpenFlow, to collect information from and forward instructions to internal forwarding boxes 120 and/or external forwarding boxes 130.

As described herein, controller 110 may be capable of discovering internal forwarding boxes 120 and/or external forwarding boxes 130. For example, controller 110 may generate and send automatic discovery queries to internal forwarding boxes 120 via a southbound interface and/or may receive responses to the discovery queries via the southbound interface. Additionally or alternatively, controller 110 may receive communications requests from external forwarding boxes 130 via the southbound interface (e.g., through an intermediate internal forwarding box 120) and may forward responses to the communications requests via the southbound interface.

As further described herein, controller 110 may be further capable of performing admission control on internal forwarding boxes 120 and/or external forwarding boxes 130. For example, controller 110 may determine when a control path is available (e.g., whether controller 110 has any open ports) between controller 110 and internal forwarding box 120 and/or external forwarding box 130. When the control path is unavailable, controller 110 may cause another controller 110 to manage internal forwarding box 120 and/or external forwarding box 130. In another example, controller 110 may determine whether external forwarding box 130 is eligible to join a software-defined network. In this example, controller 110 may determine whether controller 110 is authorized and/or able to provide control signals to external forwarding box 130.

As used herein, the term "internal forwarding box" may refer to a forwarding box included in a network, such as service provider network 101, and the term "external forwarding box" may refer to a forwarding box included a different network, such as in subscriber network 104 and/or third-party network 105. Each of internal forwarding boxes 120 and/or external forwarding boxes 130 may include a data transfer device, such as a router, a gateway, a switch (e.g., an asynchronous transfer mode (ATM) switch), a firewall, a network interface card (NIC), a hub, a bridge, a proxy server, an optical add-drop multiplexer (OADM), a line access multiplexer (LAM), or some other type of device that processes and/or transfers data. Each internal forwarding box 120 may be included within a forwarding layer of service provider network 101, and each external forwarding box 130 may be included in a forwarding layer of subscriber network 104 and/or third-party network 105. In one example, internal forwarding box 120 may be capable of establishing a first path to a content provider (e.g., to access multimedia content), and external forwarding box 130 may be capable of establishing a second path to a client device, and the first and second paths may be bridged to provide or otherwise associated with an end-to-end path between the content provider and the client device.

Orchestration system 103 may provide an interface from user devices to systems associated with service provider network 101 through orchestration layer application programming interfaces (APIs). Orchestration system 103 may support interactions between client devices and network devices associated with the service provider network 101. Orchestration system 103 may determine particular data formats to be used according to the services that a customer requests. Orchestration system 103 may also perform business functions such as controlling access to available services, providing catalogs of available services, managing customer orders, managing user profiles, and managing content licenses. Orchestration system 103 may also manage quality controls, network resources, and workflows. In one implementation, orchestration system 103 may communicate information (e.g., requirements for particular services) to controller 110 via a northbound interface in an SDN system within environment 100.

Subscriber network 104 may include, for example, a local area network (LAN), a home network, or an office network to receive services offered via service provider network 101. In one implementation, subscriber network 104 may connect to service provider network 101 via a wired access network (not shown) or a direct connection. In another other implementation, one or more devices in subscriber network 104 may also connect to service provider network 101 via a wireless access network. Devices included in subscriber network 104 may include, for example, one or more routers and/or user devices, such as a set-top box, a computer (e.g., a personal, tablet, or wearable computer), an internet television, a smart phone, a gaming system, or another device.

Third-party network 105 may include one or more server devices, or other types of computational or communication devices that gather, process, search, and/or provide information in a manner described herein. In one implementation, third-party network 105 may include a broadcasting device. Third-party network 105 may include, for example, IP content distribution facilities (e.g., IPTV). In one implementation, third-party network 105 may provide multimedia content that can be presented to a user at a user device in subscriber network 104.

In FIG. 1, the particular arrangement and number of components in environment 100 are illustrated for simplicity. In practice there may be more of service provider network 101, subscriber network 104, and/or third-party network 105, as well as additional controllers 110, internal forwarding boxes 120, and external forwarding boxes 130. Components of environment 100 may be connected via wired and/or wireless links. Furthermore, while controller 110 and internal forwarding boxes 120 are described as being included in service provider network 101, and external forwarding boxes 130 are described as being included in subscriber network 104 and/or third-party network 105, it should be appreciated that controller 110, internal forwarding boxes 120, and external forwarding boxes 130 may be included in any type of network. For example, controller 110 and internal forwarding boxes 120 may be included in a subscriber network 104 and external forwarding boxes 130 may be included in service provider network 101.

Figure 2:
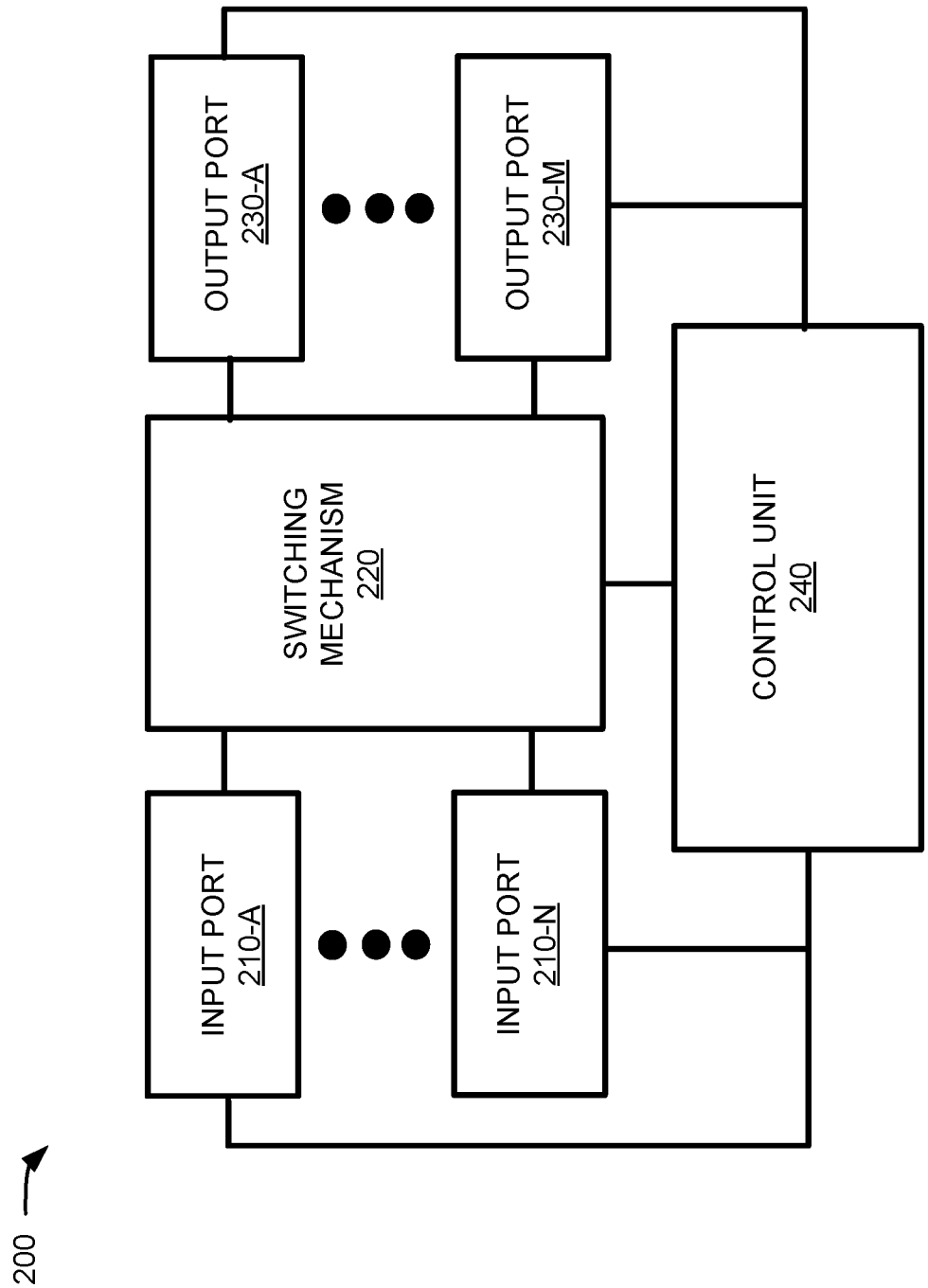
FIG. 2 is a diagram illustrating exemplary components of a routing device that may correspond to one of the devices included in the environment illustrated in FIG. 1.

FIG. 2 is a diagram illustrating exemplary components of a routing device 200. In certain implementations, an internal forwarding box 120 and/or external forwarding box 130 may include one or more routing devices 200. It should be appreciated, however, that internal forwarding box 120 and/or external forwarding box 130 may not include any type of routing device and may include a different type of network device, such as a switch, bridge, server, relay, etc. As shown in FIG. 2, routing device 200 may include one or more input ports 210-A to 210-N (referred to herein individually as "input port 210" and collectively as "input ports 210"), a switching mechanism 220, one or more output ports 230-A to 230-M (referred to herein individually as "output port 230" and collectively as "output ports 230"), and a control unit 240.

Input ports 210 may be the points of attachments for physical links and may be the points of entry for incoming traffic. An input port 210 may be associated with an interface card, a line card, an extender, a breakout card, etc. Input port 210 may perform some or all of data plane processing associated with an incoming packet. Data plane processing may encompass looking up a destination address for an incoming packet, removing (or changing) a label associated with the packet, determining a path through switching mechanism 220, and/or filtering the packet based on one or more filters.

Switching mechanism 220 may include one or more switches and/or switch fabrics to facilitate communication between input ports 210 and output ports 230. In one implementation, each of the switch fabrics may include a single or multi-stage switch of crossbar elements. In another implementation, each of the switches/switch fabrics may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card. Output port 230 may perform some or all of data plane processing associated with an outgoing packet. For example, output port 230 may classify the packet based on a quality of service class, schedule the packet in a particular queue, add (or change) a label associated with the packet, and/or filter the packet based on one or more firewall filters.

Control unit 240 may interconnect with input ports 210, switching mechanism 220, and/or output ports 230 and may control operation of routing device 200. For example, control unit 240 may communicate with controller 110 to perform control plane operations associated with routing device 200 (e.g., control unit 240 may communicate features and performance metadata of device 200 to controller 110).

Although FIG. 2 shows exemplary components of routing device 200, in other implementations, routing device 200 may include fewer components, different components, differently arranged components, and/or additional components than depicted in FIG. 2. Additionally or alternatively, one or more components of routing device 200 may perform one or more tasks described as being performed by one or more other components of routing device 200.

Figure 3:
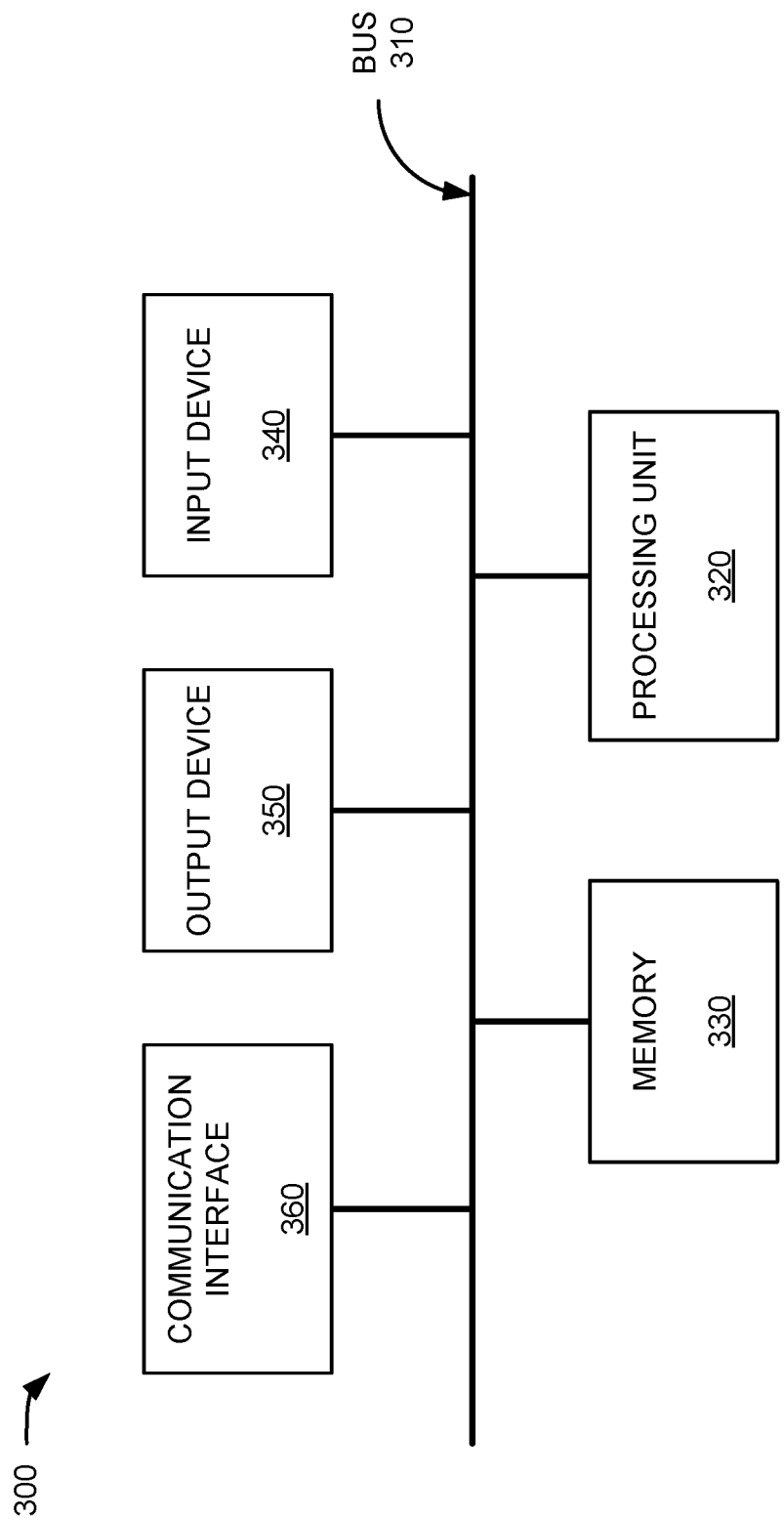
FIG. 3 is a diagram illustrating exemplary components of a computing device that may correspond to one of the devices included in the environment illustrated in FIG. 1.

FIG. 3 is a diagram of exemplary components of a device 300. Each of controller 110 and other devices in service provider network 101, subscriber network 104, and third-party network 105 may be implemented/installed as software, hardware, or a combination of hardware and software, on its respective device 300. As shown in FIG. 3, device 300 may include a bus 310, a processing unit 320, a memory 330, an input device 340, an output device 350, and a communication interface 360. In one implementation, device 300 may be configured as a network device that communicates over a network via communication interface 360. In another implementation, device 300 may be configured as part of a set-top box or media server.

Bus 310 may permit communication among the components of device 300. Processing unit 320 may include one or more processors or microprocessors that execute instructions. In other implementations, processing unit 320 may be implemented as or include one or more application specific integrated circuits (ASICs), field programmable gate arrays (FPGAs), etc.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that to receive information input to device 300, such as a keyboard, a keypad, a mouse, a pen, a microphone, a remote control, one or more biometric mechanisms, etc. Output device 350 may include a device that outputs information, such as a display, a speaker, etc.

Communication interface 360 may include a transceiver that enables device 300 to communicate with other devices and/or systems. For example, communication interface 360 may include mechanisms for communicating with other devices, such as other devices in environment 100. Each of such other devices of environment 100 may include its respective communication interface 360 to achieve such communication.

As described herein, device 300 may perform certain operations in response to processing unit 320 executing software instructions included in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. Alternatively, or additionally, one or more components of device 300 may perform one or more other tasks described as being performed by one or more other components of device 300.

Figure 4:
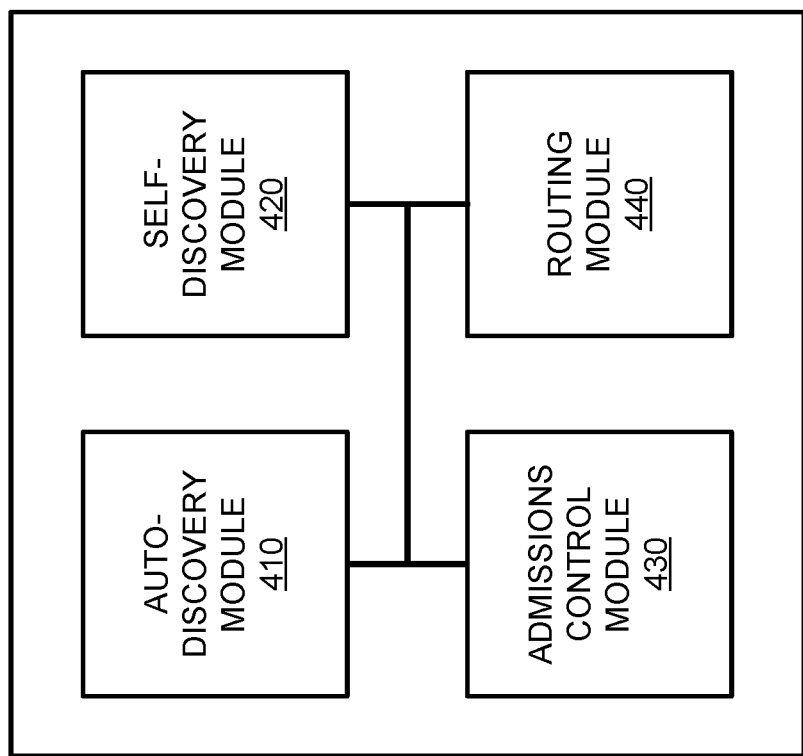
FIG. 4 is a block diagram of exemplary functional components of a controller included in the environment illustrated in FIG. 1.

FIG. 4 is a block diagram of exemplary functional components of controller 110. The functions described in connections with FIG. 4 may be performed by one or more components of device 300 (FIG. 3). As shown in FIG. 4, controller 110 may include an auto-discovery module 410, a self-discovery module 420, an admission control module 430, and a routing module 440.

Auto-discovery module 410 in controller 110 may detect internal forwarding boxes 120 and may send a message to the detected internal forwarding boxes 120 to request a binding of internal forwarding boxes 120 to the controller 110. In one implementation, auto-discovery module 410 may receive information regarding a topology of service provider network 101, and auto-discovery module 410 may use this information to forward connection requests to one or more internal forwarding boxes 120. For example, auto-discovery module 410 may store and/or determine information regarding one or more internal forwarding boxes 120 or other devices in service provider network 140. For example, auto-discovery module 410 may identify auto-discovery parameters that include one or more network addresses (or range of addresses), device identifiers (e.g., a serial number, a telephone number, a mobile device identification number, an international mobile subscriber identity, an electronic serial number, etc. This information may be stored by auto-discovery module 410 based on prior bindings between controller 110 and one or more internal forwarding boxes 120. In another example, auto-discovery module 410 may monitor traffic within service provider network 101 and may extract, from the traffic, information that identifies nodes generating, carrying, and/or receiving the traffic within service provider network 101. In yet another example, auto-discovery module 410 may communicate with another controller 110 to receive information that identifies one or more internal forwarding boxes 120 that are discovered and/or bound to the other controller 110.

Auto-discovery module 410 may use the topology information to obtain a pool of addresses that identify one or more internal forwarding boxes 120 adjacent (e.g., connected to via a communications path) to controller 110. Auto-discovery module 410 may forward binding requests to the adjacent internal forwarding boxes 120, and the binding requests may cause the adjacent internal forwarding boxes 120 to identify other internal forwarding boxes 120 (e.g. internal forwarding boxes 120 that are not adjacent to controller 110). For example, a first internal forwarding box 120 may identify a second internal forwarding box 120 (e.g. an internal forwarding box 120 that is not adjacent to or otherwise known to controller 110) that exchanges traffic with the first internal forwarding box 120. The binding requests may cause the first internal forwarding boxes 120 to forward the binding request to the second internal forwarding box 120. Additionally or alternatively, the binding requests may cause the first internal forwarding box 120 to identify the second internal forwarding box 120 to auto-discovery module 410, and auto-discovery module 410 may forward a binding request to the second other internal forwarding box 120. In this way, binding requests from auto-discovery module 410 may be distributed through at least a portion of service provider network 101.

In one implementation, auto-discovery module 410 may discover when a new internal forwarding box 120 becomes active (e.g., attempts to transmit data) and/or comes online. For example, auto-discovery module 410 may periodically send out binding requests through a portion of service provider network 101. In this example, auto-discovery module 410 may probe a network (e.g., service provider network 101) for a new internal forwarding box 120. Additionally or alternatively, an internal forwarding box 120 may notify auto-discovery module 410 when activated. For example, an internal forwarding box 120 at a physical location (e.g., within a building, neighborhood, campus, etc.) may forward a notification to a controller 110 associated with the physical location. In another example, a first internal forwarding box 120, managed by controller 110, may include, in data sent to a second internal forwarding box 120, information identifying controller 110. The information may include, for example, a network address associated with controller 110, data identifying physical paths to controller 110, intermediate nodes, a geographic location (e.g., longitude/latitude pair), etc. In response to (or based on) the information identifying controller 110, the second internal forwarding box 120 may forward data identifying itself to controller 110.

Based on receiving the binding request from auto-discovery module 410, internal forwarding box 120 may respond with status information. The status information may indicate, for example, whether a binding already exists between the internal forwarding box 120 and another controller 110. For example, the status information may indicate whether the discovered internal forwarding box 120 is receiving control instructions from one or more controllers 110. The status information may further identify characteristics associated with traffic handled by the discovered internal forwarding box 120, such as an amount/type of traffic transmitted via the discovered internal forwarding box 120, characteristics associated with the transmission via the discovered internal forwarding box 120 (e.g., a bandwidth, a number of dropped packets, jitter, etc.).

As shown in FIG. 4, controller 110 may further include self-discovery module 420. Self-discovery module 420 may identify one or more external forwarding boxes 130. For example, self-discovery module 420 may receive a notification from an internal forwarding box 120 (e.g., identified by auto-discovery module 410) when the internal forwarding box 120 exchanges data with the external forwarding box 130. For example, the internal forwarding box 120 may send a notification to self-discovery module 420 when external forwarding box 130 exchanges data via a path that includes the particular internal forwarding box 120. The notification may include, for example, data identifying attributes associated with external forwarding box 130 (e.g., a device type, a network address, data identifying an operator associated with subscriber network 104 and/or third-party network 105, etc.). The notification may further include metadata associated with the data being exchanged by external forwarding box 130, such as a data size, a data type, quality of service (QoS), application associated with the exchanged data, etc.

In one implementation, the internal forwarding box 120 may send the notification identifying external forwarding box 130 based on the binding request from auto-discovery module 410. For example, the binding request may cause internal forwarding box 120 to forward the notification when a request is received from external forwarding box 130 to establish a flow or otherwise exchange data with the internal forwarding box 120.

The notification may further identify characteristics associated with a connection between external forwarding box 130 and internal forwarding box 120 (e.g., an amount of data carried on the connection, QoS, a number of dropped packets, jitter, etc.) and/or attributes of connections between external forwarding box 130 and other devices.

As shown in FIG. 4, controller 110 may also include admission control module 430. Admission control module 430 may determine whether controller 110 should manage an internal forwarding box 120 (discovered by auto-discovery module 410) and/or an external forwarding box 130 (discovered by self-discovery module 420). For example, admission control module 430 may authenticate internal forwarding box 120 and/or an external forwarding box 130 and may determine whether internal forwarding box 120 and/or an external forwarding box 130 is authorized to join a software defined network associated with controller 110. For example, admission control module 430 may evaluate a message (e.g., a connection request) and/or data received from internal forwarding box 120 and may extract the network address for the internal forwarding box 120 from the message and/or data. Admission control module 430 may determine whether to admit internal forwarding box 120 based on the network address.

In one example, admission control module 430 may determine whether internal forwarding box 120 is located within a particular region and/or coupled to a physical link allocated to (i.e., managed by) the controller 110. If admission control module 430 determines that internal forwarding box 120 is not located within a particular region and/or coupled to a physical link associated with particular controller 110, admission control module 430 may determine that the internal forwarding box 120 should be managed by another controller 110.

In another example, admission control module 430 may determine whether internal forwarding box 120 is capable of performing a particular function or providing a particular feature. For example, controller 110 may admit internal forwarding box 120 that is capable of handling a particular type of data and/or performing a particular type of signal processing. Controller 110 may choose to manage internal forwarding box 120 if box 120 is capable of handling a sufficient bandwidth of traffic and/or providing a desired type of connection to other components of a network (e.g., service provider network 101, etc.). For example, controller 110 may admit internal forwarding box 120 in order to manage components in a path between two points, to control components included in a mesh within a network, etc.

In yet another example, controller 110 may perform a particular function (e.g., controlling transmissions associated with data of a particular type or data associated with a particular application), and admission control module 430 may determine whether internal forwarding box 120 is exchanging data related to the particular function. For example, admission control module 430 may evaluate traffic exchanged by internal forwarding box 120 based on an inspection of header data. Additionally or alternatively, admission control module 430 may perform deep or shallow packet inspection or use other techniques to examine payload data to identify a function associated with the data.

Admission control module 430 may further evaluate a particular external forwarding box 130 based on an associated intermediate internal forwarding box 120 (e.g., the internal forwarding box 120 the exchanges data between controller 110 and the particular external forwarding box 130). For example, admission control module 430 may admit (e.g., allow controller 110 to provide routing information for) the particular external forwarding box 130 if the intermediate internal forwarding box 120 is admitted. In another example, admission control module 430 may determine whether external forwarding box 130 is associated with a particular user or organization, or whether external forwarding box 130 is included in subscriber network 104 and/or third-party network, to allow controller 110 to control external forwarding box 130.

In another implementation, admission control module 430 may determine whether controller 110 is capable of managing internal forwarding box 120 and/or external forwarding box 130. For example, admission control module 430 may determine whether binding the internal forwarding box 120 or external forwarding box 130 to the controller 110 would exceed a maximum number of internal forwarding boxes 120 or external forwarding boxes 130 that controller 110 can (is allowed to) manage. In another example, admission control module 430 may identify a maximum amount of bandwidth for sending control data from controller 110. Admission control module 430 may determine an expected amount of traffic exchanged between controller 110 and internal forwarding box 120 and/or external forwarding box 130. For example, admission control module 430 may identify the expected amount of traffic based on amounts of traffic previously sent by controller 110 to the internal forwarding box 120 and/or external forwarding box 130. Admission control module 430 may further determine whether adding a newly discovered internal forwarding box 120 or external forwarding box 130 would cause controller 110 to exceed the maximum bandwidth amount for controller 110.

In one implementation, admission control module 430 may determine that internal forwarding box 120 and/or external forwarding box 130 should be managed by another controller 110. Admission control module 430 may forward a message identifying (e.g., providing a network address for) the other controller 110 to the internal forwarding box 120 and/or external forwarding box 130. The internal forwarding box 120 and/or external forwarding box 130 may then forward a binding request to the other controller 110 based on contents of the message. Additionally or alternatively, admission control module 430 may forward information (e.g., a network address) identifying internal forwarding box 120 and/or external forwarding box 130 to the other controller 110, and the other controller 110 may use this information to establishing a binding with internal forwarding box 120. The information to the other controller 110 may further indicate whether internal forwarding box 120 and/or external forwarding box 130 has been authenticated by admission control module 430. For example, admission control module 430 may establish a path to the new controller 110 related to performing admissions control.

In one implementation, admission control module 430 may select the other controller 110 based on a status of internal forwarding boxes 120 or external forwarding boxes 130 to be assigned to the other controller 110. For example, admission control module 430 may cause internal forwarding boxes 120 or external forwarding boxes 130 to be associated with another controller 110 that has available bandwidth to communicate with internal forwarding boxes 120 or external forwarding boxes 130. In another example, admission control module 430 may cause an internal forwarding box 120 or an external forwarding box 130 that are handling are particular type of traffic (e.g., traffic associated with a particular application) to be assigned to a controller 110 for managing the particular type of traffic. For example, if a first controller 110, which manages VoIP traffic, discovers a internal forwarding box 120 that is exchanging multimedia traffic, admission control module 430 may cause the internal forwarding box 120 to be assigned to a second controller 110 that manages multimedia traffic.

In another implementation, admission control module 430 may monitor traffic exchanged via one or more internal forwarding boxes 120 or external forwarding boxes 130 associated with a controller 110. If one or more characteristics of the traffic (e.g., measured levels of delay, jitter, bandwidth, etc.) do not comply with desired threshold values, admission control module 430 may cause the internal forwarding boxes 120 or the external forwarding boxes 130 to be assigned to another controller 110 with available capacity.

In yet another implementation, admission control module 430 may assign respective priorities to internal forwarding boxes 120 and/or external forwarding boxes 130. For example, admission control module 430 may admit a certain number of internal forwarding boxes 120 and may admit a smaller number of external forwarding boxes 130. In another example, admission control module 430 may admit a particular total number of internal forwarding boxes 120 and may admit a smaller number of external forwarding boxes 130, and if another internal forwarding box 120 is discovered, admission control module 430 may cause one of external forwarding box 130 to be reassigned to another controller 110. In yet another example, adjacent internal forwarding boxes 120 (and external forwarding boxes 130 connected thereto) may be prioritized (e.g., admitted to controller 110) before non-adjacent internal forwarding boxes 120 (and external forwarding boxes 130 connected thereto). In still another example, when more than a threshold number of internal forwarding boxes 120 and/or external forwarding boxes 130 attempt to connect to a particular controller 110 during a time period, controller 110 may admit the internal forwarding boxes 120 and/or external forwarding boxes 130 in a round robin-fashion or using another selection algorithm.

As shown in FIG. 4, controller 110 may include routing module 440. Routing module 440 may monitor data exchanged by internal forwarding boxes 120 and/or external forwarding boxes 130. For example, routing module 440 may monitor flows within a network (e.g., service provider network 101), and routing module 440 may determine the status of these flows. For example, routing module 440 may identify internal forwarding boxes 120 and/or external forwarding boxes 130 carrying the flows, and routing module 440 may determine the status of internal forwarding boxes 120 and/or external forwarding boxes 130. For example, routing module 440 may determine the status of ports, queues, etc. of internal forwarding boxes 120 and/or external forwarding boxes 130. Routing module 440 may use the status information to direct the exchange of data via internal forwarding boxes 120 and/or external forwarding boxes 130, such as cause data to be routed via internal forwarding boxes 120 and/or external forwarding boxes 130 that have available ports. Additionally or alternatively, routing module 440 may cause data to be routed via internal forwarding boxes 120 and/or external forwarding boxes 130 that have, based on the status information, desired transmission characteristics (e.g., sufficient bandwidth and/or desired levels of transmission delay, dropped packets, etc.). For example, routing module 440 may generate a routing table and/or a forwarding table used by internal forwarding boxes 120 and/or external forwarding boxes 130 to exchange traffic.

Although FIG. 4 shows exemplary functional components of controller 110, in other implementations, controller 110 may include fewer components, different components, or additional components than those depicted in FIG. 4. For example, in other implementations, controller 110 may include interfaces to communicate with other controllers 110 (e.g., within a federation) and/or to receive policy updates from other systems. In another example, components shown in FIG. 4 may be included in multiple controllers 110. For example, a first group of controllers 110 may include one or more of auto-discovery module 410, self-discovery module 420, and admissions control module 430, and a second different group of controllers 110 may include routing module 440. Thus, environment 100 may include a first group of controllers 110 to perform discovery and admissions control on internal forwarding boxes 120/external forwarding boxes 130, and a second group of controller 110 to perform routing operations.

FIGS. 5A-5D are diagrams of exemplary communications among devices within different portions of environment 100. In FIGS. 5A-5D, the portions are shown as portions 500-A through 500-D. The communications illustrated in FIGS. 5A-5D are simplified versions of communications for discovering internal forwarding boxes 120 and/or external forwarding boxes 130 and for performing admissions control on the discovered internal forwarding boxes 120 and/or external forwarding boxes 130. As shown in FIGS. 5A-5D, portions 500-A through 500-D may include controllers 110, internal forwarding boxes 120, and external forwarding boxes 130. Controllers 110, internal forwarding boxes 120, and external forwarding boxes 130 may include features described above in connection with, for example, FIGS. 1-4.

Figure 5A:
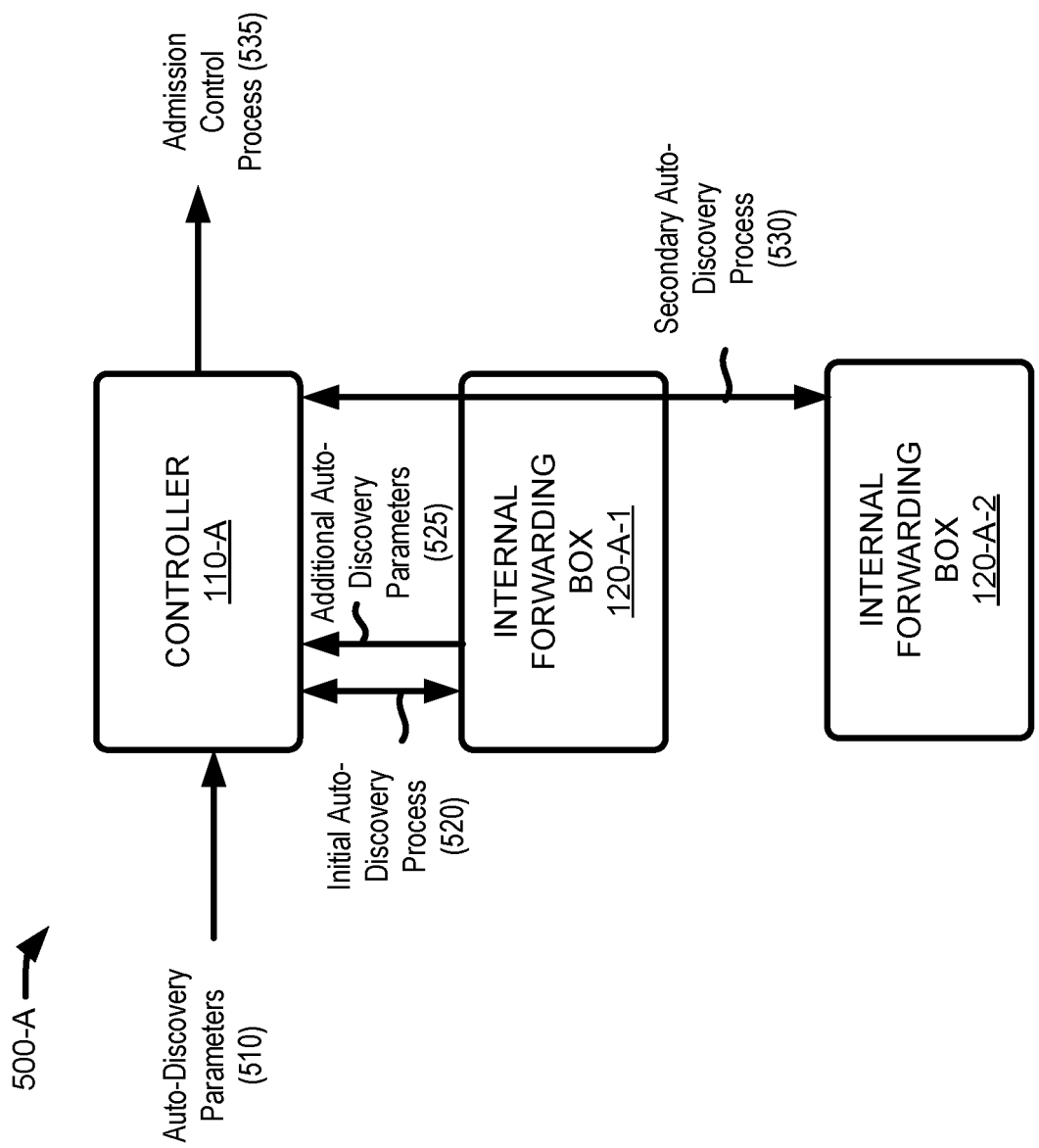

As shown in FIG. 5A, controller 110-A may receive and/or determine auto-discovery parameters 510. Auto-discovery parameters 510 may include, for example, network addresses of one or more internal forwarding boxes 120 (e.g., internal forwarding box 120-A-1) assigned to controller 110-A. Additionally or alternatively, auto-discovery parameters 510 may include other attributes that may be used by controller 110-A to identify internal forwarding box 120-A-1. For example, auto-discovery parameters 510 may identify a manufacturer, a device type, a model, a function, an assigned application, etc. associated with internal forwarding box 120-A-1.

As further shown in FIG. 5A, controller 110-A may perform an initial auto-discovery process 520 based on auto-discovery parameters 510. For example, as described above with respect to FIG. 4, auto-discovery module 410 may identify to one or more adjacent internal forwarding boxes 120 (internal forwarding box 120-A-1 in FIG. 5A) based on auto-discovery parameters 510 and may forward messages to the one or more adjacent internal forwarding boxes 120. The message sent by auto-discovery module 410 may request a response from the adjacent internal forwarding box 120-A-1. For example, an adjacent internal forwarding box 120-A-1 may forward information identifying a status of the adjacent internal forwarding box 120-A-1, such as an indication of whether the adjacent internal forwarding box 120-A-1 is active, exchanging data, bound to another controller 110, etc.

The response from adjacent internal forwarding box 120-A-1 may further include, for example, additional auto-discovery parameters 525 identifying an internal forwarding box 120-A-2 that are not adjacent to or otherwise known to controller 110-A. For example, additional auto-discovery parameters 525 may identify a network address (or range of network addresses) associated with traffic received by and/or sent from adjacent forwarding box 120-A-1. Controller 110-A may perform secondary auto-discovery process 530 based on additional auto-discovery parameters 525. For example, auto-discovery module 410 may send a message to non-adjacent internal forwarding box 120-A-2 requesting a binding. As previously described, non-adjacent internal forwarding box 120-A-2 may send a response identifying its status, and controller 110-A may form a binding with non-adjacent internal forwarding box 120-A-2 based on the response. In turn, the response from non-adjacent internal forwarding box 120-A-2 may provide further additional auto-discovery parameters 525 (not shown) identifying other internal forwarding boxes 120 (not shown), and controller 110-A may perform another secondary auto-discovery process 530 to identify the other internal forwarding boxes 120.

As shown in FIG. 5A, controller 110-A may perform admission control process 535 to determine whether to admit internal forwarding boxes 120-A-1 and 120-A-2 identified via initial auto-discovery process 520 or secondary auto-discovery process 530. For example, as described in the discussion of FIG. 4, admission control module 430 may determine whether controller 110-A has capacity to manage a discovered internal forwarding box 120. For example, admission control module 430 may determine whether controller 100 has available bandwidth to receive communications from a discovered internal forwarding box 120.

Figure 5B:
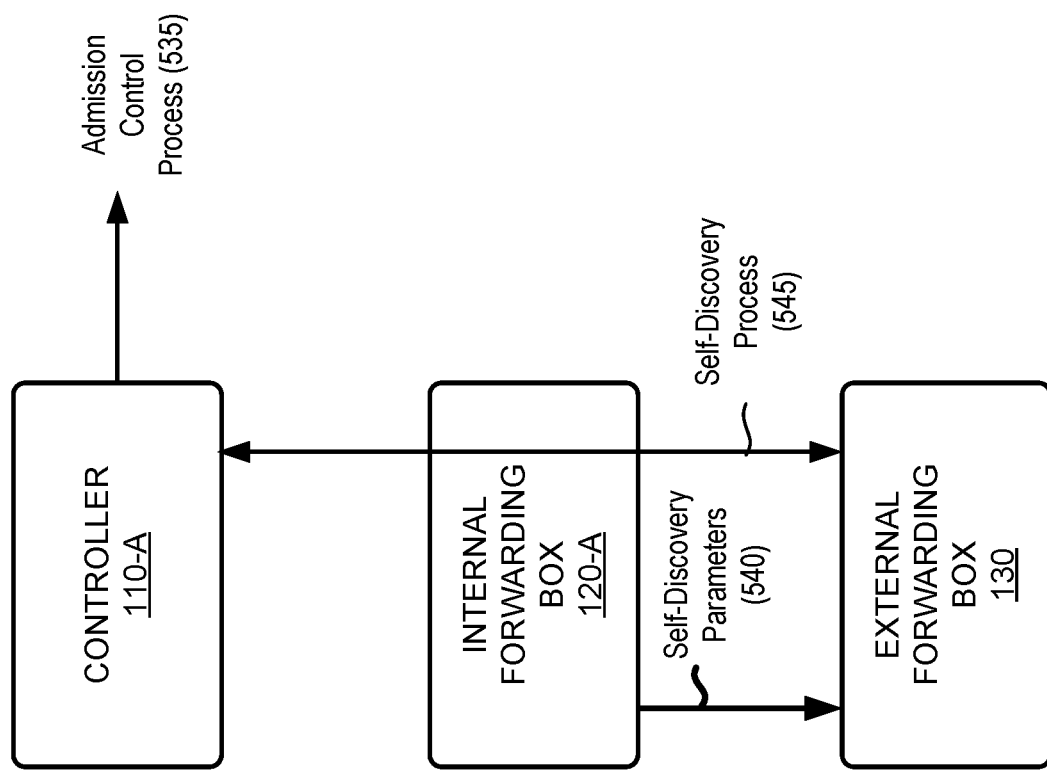

FIG. 5B shows a portion 500-B of environment 100. As shown in FIG. 5B, portion 500-B may include internal forwarding box 120-A (e.g., internal forwarding box 120 discovered by controller 110-A via initial auto-discovery process 520 and/or via secondary auto-discovery process 530), and internal forwarding box 120-A may forward self-discovery parameters 540 to external forwarding box 130. For example, internal forwarding box 120-A may forward self-discovery parameters 540 during auto-discovery processes 520 or 530. Self-discovery parameters 540 may include, for example, data identifying controller 110-A (e.g., a network address) and/or other internal forwarding box 120 (e.g. internal forwarding box 120 positioned in a path between controller 110-A and the internal forwarding box 120-A forwarding self-discovery parameters 540. Self-discovery parameters 540 may further include information identifying a relationship between internal forwarding box 120-A and controller 110-A. For example, self-discovery parameters 540 may indicate whether internal forwarding box 120-A is adjacent to and/or managed by controller 110-A. In one implementation, internal forwarding box 120-A may forward self-discovery parameters 540 based on forming a binding with controller 110-A.

External forwarding box 130 may use self-discovery parameters 540 to conduct self-discovery process 545. For example, external forwarding box 130 may use information in self-discovery parameters 540 to locate and forward a connection request to controller 110-A. In one example, controller 110-A may identify a particular internal forwarding box 120-A associated with (e.g., positioned on a path to controller 110-A) external forwarding box 130 based on data exchanged during self-discovery process 545. For example, the connection request from external forwarding box 130 may include data identifying an intermediate internal forwarding box 120-A. In another example, controller 110-A may identify intermediate internal forwarding box 120-A by processing data received from external forwarding box 130 to identify, as intermediate internal forwarding box 120-A, a node carrying data between controller 110-A and external forwarding box 130.

In another implementation, controller 110-A may identify one or more additional external forwarding box 130 (not shown) associated with (e.g., positioned on a path to controller 110-A) the particular external forwarding box 130 engaging in self-discovery process 545. For example, the connection request from the external forwarding box 130 may include data identifying the one or more additional external forwarding boxes 130. In another example, controller 110-A may identify the one or more additional external forwarding boxes 130 by processing data received from the particular external forwarding box 130 to identify nodes that may correspond to the additional external forwarding boxes 130.

After controller 110-A identifies external forwarding box 130 via self-discovery process 545, controller 110-A may perform admission control process 535 with respect to external forwarding box 130. In one example, controller 110-A (e.g., admission control module 430) may evaluate whether to admit external forwarding box 130 into a software defined network based on the admission status of an intermediate internal forwarding box 120-A. For example, if controller 110-A manages traffic carried via a particular internal forwarding box 120-A, an external forwarding box 130 linked to the particular internal forwarding box 120-A may be also be admitted. In another example, if a particular external forwarding box 130 communicates with controller 110-A via an intermediate external forwarding box 130 (not shown), controller 110-A may evaluate whether to manage the particular external forwarding box 130 based whether controller 110-A is managing transmissions by the intermediate external forwarding box 130.

In another implementation, admission control module 430 may determine whether to admit external forwarding box 130 based on other factors, such as status of controller 110-A. For example, admission control module 430 may determine whether to admit external forwarding box 130 based on whether controller 110-A has available bandwidth capacity to communicate with the external forwarding box 130. Additionally or alternatively, admission control module 430 may determine whether to admit external forwarding box 130 based on functions performed by external forwarding box 130.

In one implementation, admission control process 535 in FIGS. 5B and/or 5C may include determining an amount of bandwidth available through controller 110-A and allocating a portion of this bandwidth to a newly admitted internal forwarding box 120-A or external forwarding box 130. In one example, a first amount of bandwidth may be allocated to internal forwarding box 120-A, and a second amount of bandwidth may be allocated to external forwarding box 130. In another example, a first amount of bandwidth allocated to external forwarding box 130 may be in proportion to or otherwise be determined based on a second amount of bandwidth allocated to a related (e.g., intermediate) internal forwarding box 120.

Figure 5C:
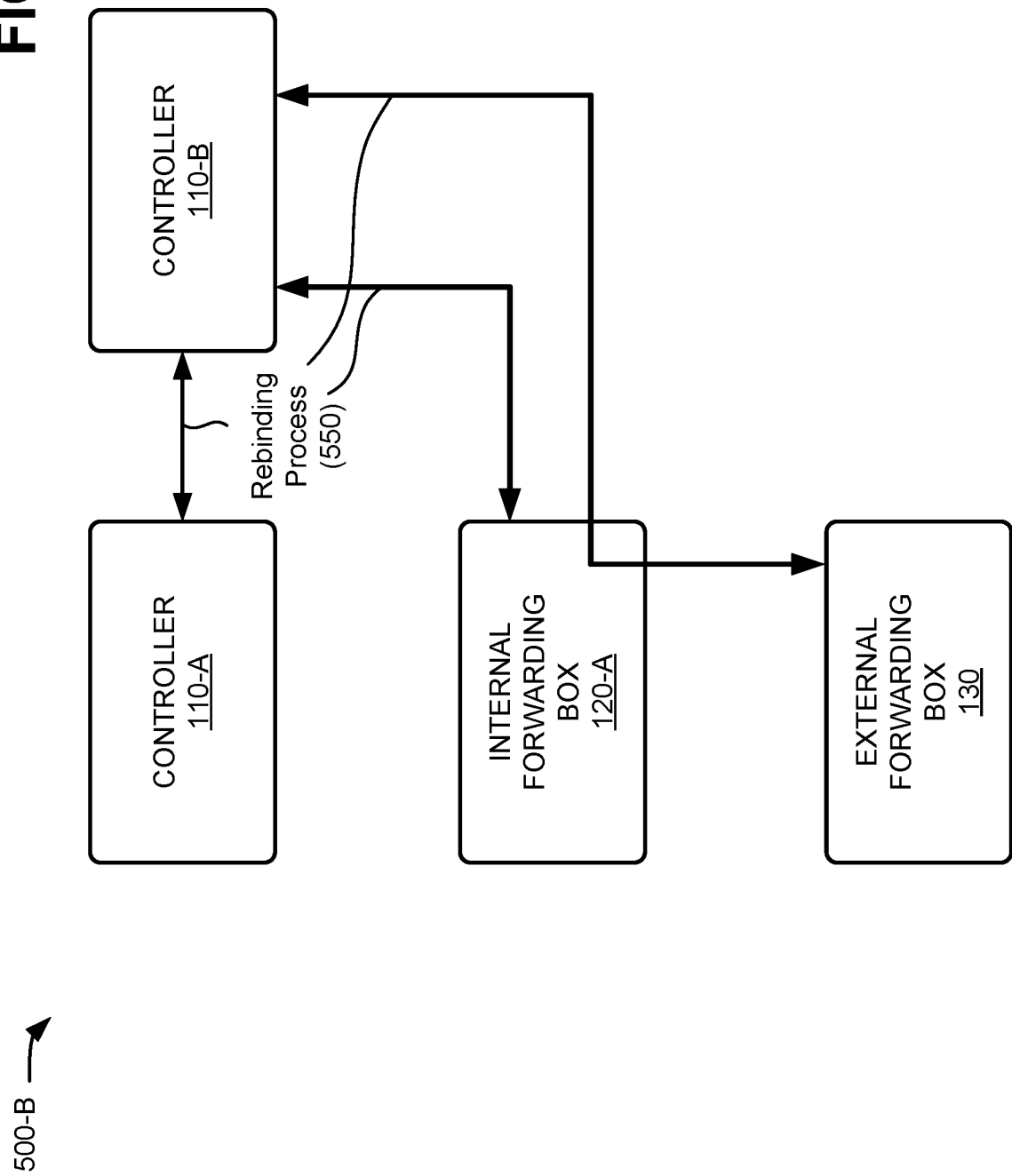

As shown in FIG. 5C, a portion 500-C of environment 100 may perform a rebinding process 550. For example, a first controller 110-A may perform rebinding process 550 to cause internal forwarding box 120-A to be assigned to a second, different controller 110-B. For example, first controller 110-A may perform rebinding process 550 when admissions control process 535 determines that internal forwarding box 120-A cannot be admitted (e.g., controller 110-A does not have available bandwidth capacity and/or controller 110-A cannot perform a function needed by internal forwarding box 120-A). For example, if internal forwarding box 120-A exchanges data within a private and/or encrypted network, rebinding process 550 may be performed if controller 110-A is not authorized and/or cannot access portions of the encrypted data needed to form routing/forwarding instructions. In rebinding process 550, first controller 110-A may forward data to second controller 110-B and/or to internal forwarding box 120-A to enable a binding between second controller 110-B and/or to internal forwarding box 120-A. For example, controller 110-A may forward network addresses or other data for second controller 110-B and/or to internal forwarding box 120-A that would enable the two devices to communicate with each other. First controller 110-A may also forward, to second controller 110-B, an indication of whether internal forwarding box 120-A has been authenticated. First controller 110-A may also forward, to second controller 110-B, information identifying other related internal forwarding boxes 120 (e.g., intermediate internal forwarding boxes 120) that are controlled by first controller 110-A and/or second controller 110-A.

As further shown in FIG. 5C, rebinding process 550 may include reassigning external forwarding box 130 (e.g., a node in subscriber network 104 exchanging data with internal forwarding box 120-A) to second controller 110-B based on reassigning internal forwarding box 120-A to second controller 110-B. For example, rebinding process 550 may identify external forwarding box 130 to second controller 110-B so that second controller 110-B may determine whether to admit external forwarding box 130.

As shown in FIG. 5D, a portion 500-D of environment 100 may perform rebinding process 550 that includes first controller 110-A reassigning external forwarding box 130 (previously associated with a first internal forwarding box 120-A) to a second internal forwarding box 120-B. In this instance, rebinding process 550 may include first controller 110-A retaining control of first internal forwarding box 120-A and ceding control of external forwarding box 130 to second controller 110-B. For example, first controller 110-A may not have sufficient bandwidth or other resource to manage a discovered external forwarding box 130 that forwarded a connection request via first internal forwarding box 120-A. In this implementation, rebinding process 550 may include providing information regarding external forwarding box 130 to second controller 110-B and/or to second internal forwarding box 120-B so that a virtual communicates path may be established between second controller 110-B and external forwarding box 130 via second internal forwarding box 120-B.

Although FIGS. 5A-5D show exemplary communications within portions 500-A through 500-D, in other implementations, portions 500-A through 500-D may include fewer communications, different communications, and/or additional communications than those depicted in FIGS. 5A-5D. Alternatively, or additionally, one or more components of portions 500-A through 500-D may perform one or more other tasks described as being performed by one or more other components of portions 500-A through 500-D.

FIG. 6 is a flow diagram of an exemplary process 600 for establishing a software defined network that includes internal forwarding boxes 120 and external forwarding boxes 130. In one implementation, process 600 may be performed by one or more controllers 110. In another implementation, process 600 may be performed by one or more other devices from environment 100 (e.g., internal forwarding box 120 and/or external forwarding box 130) in conjunction with or instead of controller 110.

As shown in FIG. 6, process 600 may include identifying auto-discovery parameters 510 (block 610). For example, controller 110 may receive, from orchestration system 103, parameters (e.g., network addresses or other data) identifying one or more internal forwarding boxes 120 allocated to controller 110. In another implementation, a controller 110 may determine auto-discovery parameters 510 identifying internal forwarding boxes 120 that were previously managed by the controller 110 during a prior time period.

As shown in FIG. 6, process 600 may further include controller 110 using the auto-discovery parameters to perform auto-discovery to identify one or more internal forwarding boxes 120 (block 620). For example, controller 110 may forward a request to the identified one or more internal forwarding boxes 120 to request a binding. For example, the request may cause the internal forwarding boxes 120 to provide status information to controller 110, and controller 110 may use this status information to determine whether the internal forwarding boxes 120 are already being controlled by another controller 110. The status information may also identify, for example, an available bandwidth between controller 110 and internal forwarding box 120. The status information may identify further additional internal forwarding boxes 120 that are communicating with or otherwise known to the identified internal forwarding boxes 120, and controller 110 may use the status information to forward a binding request to the other internal forwarding boxes 120. In this way, controller 110 may discover internal forwarding boxes 120 without receiving a request from internal forwarding boxes 120.

Continuing with FIG. 6, process 600 may further include performing self-discovery to identify one or more external forwarding boxes 130 (block 630). For example, controller 110 may receive a request from external forwarding boxes 130 to establish a binding. A request from an external forwarding box 130 may include, for example, information identifying a status of the external forwarding box 130. The request may further identify one or more internal forwarding boxes 120 with which the external forwarding box 130 communicates and/or use to forward the request to controller 110.

As shown in FIG. 6, process 600 may still further include preforming admission control on internal forwarding boxes 120 and external forwarding boxes 130 (block 640). For example, controller 110 may determine whether it is authorized and/or capable of providing control signal to a discovered internal forwarding box 120 or external forwarding box 130. Aspects of preforming admission control on internal forwarding boxes 120 and external forwarding boxes 130 in block 640 are described in greater detail below in the discussion of FIG. 7.

FIG. 7 is a flow diagram of an exemplary process 700 for preforming admission control on a discovered internal forwarding box 120 or external forwarding box 130. In one implementation, process 700 may be performed by one or more controllers 110. In another implementation, process 700 may be performed by one or more others devices from environment 100 (e.g., internal forwarding box 120 and/or external forwarding box 130) in conjunction with or instead of controller 110.

As shown in FIG. 7, process 700 may include authenticating a discovered forwarding box 120/130 (block 710). For example, controller 110 may assume that internal forwarding boxes 120 identified based on the auto-discovery parameters are authenticated. Controller 110 may further authenticate another internal forwarding box 120 or external forwarding box 130 if the other internal forwarding box 120 or external forwarding box 130 communicates with controller 110 via (or is otherwise associated with) a particular internal forwarding box 120 that is already authenticated by controller 110. For example, controller 110 may authenticate another internal forwarding box 120 or an external forwarding box 130 if an intermediate internal forward box 120, positioned between controller 110 and the other internal forwarding box 120 or external forwarding box 130, was auto-discovered using the auto-discovery parameters.

In another implementation, controller 110 may authenticate internal forwarding box 120 or external forwarding box 130 in block 710 based on one or more attributes of internal forwarding box 120 or external forwarding box 130, such an owner, a geographic location, a network topology (e.g., whether internal forwarding box 120 is included in sub-network 102 associated with controller 110), a functionality, a manufacturer, a model, etc. associated with internal forwarding box 120 or external forwarding box 130.

In yet another implementation, if a first forwarding box 120/130 is authenticated by controller 110, then controller 110 may determine whether to automatically authenticate a second forwarding box 120/130 based on a relationship between the first and the second forwarding box 120/130. For example, controller 110 may automatically authenticate the second forwarding box 120/130 if the second forwarding box 120/130 and the authenticated first forwarding box 120/130 share one or more attributes, such an common owner, a common geographic location, a common network topology, a common functionality, a common manufacturer, a common model, etc.

As shown in FIG. 7, process 700 may further include verifying that controller 110 has sufficient capacity to manage a discovered internal forwarding box 120 and/or external forwarding box 130 (block 720). For example, controller 110 may determine whether allocating a bandwidth from controller 110 to provide routing commands to a discovered internal forwarding box 120 and/or external forwarding box 130 would cause controller 110 to exceed a maximum threshold bandwidth level. Additionally, controller 110 may allocate a limited amount of bandwidth to a discovered internal forwarding box 120 and/or external forwarding box 130 so that a total amount of traffic handled by controller 110 does not exceed the maximum threshold level, and controller 110 may determine whether the limited amount would adversely affect the operation of the internal forwarding box 120 and/or external forwarding box 130.

In one implementation, controller 110 may reallocate bandwidth already assigned to a managed internal forwarding box 120 or external forwarding box 130 to a newly discovered internal forwarding box 120 or external forwarding box 130. The reallocation may include, for example, reallocating bandwidth from a managed external forwarding box 130 to a discovered internal forwarding box 120 (e.g., so that internal forwarding box 120 are favored by controller 110 relative to external forwarding box 130). In another example, controller 110 may reallocate to achieve a particular policy goal, such as to provide sufficient bandwidth to internal forwarding boxes 120 and/or external forwarding boxes 130 associated with a particular client and/to provide sufficient bandwidth on a particular path. In yet another example, controller 110 may identify bandwidth associated with internal forwarding box 120 and/or external forwarding box 130 that have been managed by controller 110 for more than a threshold amount of time, and controller 110 may reassign this bandwidth to a newly discovered internal forwarding box 120 and/or external forwarding box 130. In this example, controller 110 may remove bandwidth from internal forwarding box 120 and/or external forwarding box 130 that have not been active for more than a threshold amount of time.

As shown in FIG. 7, process 700 may further include monitoring communications exchanged between controller 110 and internal forwarding box 120 and/or external forwarding box 130 (block 730). For example, controller 110 may monitor transmissions between controller 110 and internal forwarding box 120 and/or external forwarding box 130. In another example, controller 110 may determine a quality of transmissions between a first forwarding box 120/130 and another forwarding box 120/130. Controller 110 may determine whether transmission exchanged by internal forwarding box 120 and/or external forwarding box 130 satisfy desired threshold levels (or ranges) of bandwidth, delay, dropped packets, jitter, etc.

Continuing with FIG. 7, process 700 may still further include associating internal forwarding box 120 and/or external forwarding box 130 with another controller 110 if forwarding box is not authenticated, controller does not have capacity, and/or quality of communications does not satisfy a desired criterion (block 740). For example, as described above with respect to FIGS. 5C and 5D, a first controller 110 may cause an internal forwarding box 120 (and one or more connected external forwarding boxed 130) to be reassigned from a first controller 110 to a second controller 110. For example, first controller 110 may provide information to second controller 110 to enable it to communicate with an internal forwarding box 120 being transferred. In another example, first controller 110 may provide information, such as a network address associated with another internal forwarding box 120 associated with second controller 110 to enable external forwarding box 130 to communicate with second controller 110 via the other internal forwarding box 120.

According to systems and methods described herein, a controller, in a software-defined networking control layer, may determine auto-discovery parameters and may use the auto-discovery parameters to identify a first set of forwarding boxes within a network (such as a service provider network). The controller may further identify a second set of forwarding boxes within the network that communicate with or are otherwise coupled to the first set of forwarding boxes. The controller may forward requests to the identified first and second sets of forwarding boxes to control traffic exchanged via the first and second sets of forwarding box. A third set of forwarding boxes located outside the network may request admissions into the software defined network, and requests from the third set of forwarding boxes may be forwarded to the controller via the first and/or second sets of forwarding boxes. The controller may authenticate the second and the third sets of forwarding boxes based on their relationship to the first set of forwarding boxes. The controller may further determine whether sufficient bandwidth is available between the controller and members of the first, second, and/or third sets of forwarding boxes to enable control information to be sent from the controller. The controller may further allocate amounts of bandwidth between the controller and members of the first, second, and/or third sets of forwarding boxes. If there is insufficient bandwidth and/or the quality of communications between the controller and members of the first, second, and/or third sets of forwarding boxes does not comply with one or more desired characteristics, the controller may cause control of one of the forwarding boxes to be reassigned to another controller.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, although environment 100 includes a separate controller 110 and orchestration server 103, according to other embodiments, these devices may be combined or their functions distributed among different components within network environment 105. An another example, while series of blocks have been described with respect to processes 600 and 700 in FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code, and it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   identifying, by a processor included in a controller associated with a network, a discovery parameter;
   identifying, by the processor, a first forwarding box using the discovery parameter, wherein the first forwarding box is included in the network;
   forwarding, by the processor, a message to the first forwarding box, wherein the message requests a response from the first forwarding box;
   receiving, by the processor, the response from the first forwarding box, wherein the response includes a status of the first forwarding box;
   authorizing, by the processor and based on the status of the first forwarding box, the first forwarding box to join a software-defined network associated with the controller, wherein authorizing the first forwarding box to join the software-defined network includes:
   authenticating the first forwarding box; and
   authorizing the first forwarding box to join the software-defined network based on authenticating the first forwarding box;
   receiving, by the processor and via the first forwarding box, a connection request from a second forwarding box, wherein the second forwarding box is not included in the network, and wherein the connection request includes a status of the second forwarding box and an identity of the first forwarding box; and
   authorizing, by the processor and based on the status of the second forwarding box, the second forwarding box to join the software-defined network, wherein authorizing the second forwarding box to join the software-defined network includes:
   automatically authenticating the second forwarding box based on a relationship between the first forwarding box and the second forwarding box when the first forwarding box is authenticated.

2. The method of claim 1, wherein the response from the first forwarding box includes information identifying a third forwarding box, wherein the third forwarding box is included in the network, and wherein the method further comprises:
   forwarding a second message to the third forwarding box;
   receiving a second response from the third forwarding box, wherein the second response includes a status of the third forwarding box; and
   authorizing, based on the status of the third forwarding box, the third forwarding box to join the software-defined network.

3. The method of claim 1, wherein authorizing the first forwarding box to join the software-defined network comprises:
   determining that the controller has available bandwidth to receive communications from the first forwarding box; and
   authorizing the first forwarding box to join the software-defined network based on determining that the controller has the available bandwidth.

4. The method of claim 1, further comprising:
   determining a total amount of bandwidth available through the controller; and
   allocating a portion of the total amount of bandwidth to the first forwarding box.

5. The method of claim 1, wherein authorizing the second forwarding box to join the software-defined network further includes authorizing the second forwarding box to join the software-defined network based on functions performed by the second forwarding box.

6. The method of claim 1, wherein authorizing the second forwarding box to join the software-defined network further includes authorizing the second forwarding box to join the software-defined network when the controller is authorized to provide a control signal to the second forwarding box.

7. A device comprising:
   a memory configured to store instructions; and
   a processor configured to execute one or more of the instructions to:
   identify a discovery parameter;
   identify a first forwarding box using the discovery parameter, wherein the first forwarding box is included in a network associated with the device;
   forward a message to the first forwarding box, wherein the message requests a response from the first forwarding box;
   receive the response from the first forwarding box, wherein the response includes a status of the first forwarding box;
   authorize, based on the status of the first forwarding box, the first forwarding box to join a software-defined network, wherein, when authorizing the first forwarding box to join the software-defined network, the processor is further configured to:
 authenticate the first forwarding box; and
 authorize the first forwarding box to join the software-defined network based on authenticating the first forwarding box;
receive, via the first forwarding box, a connection request from a second forwarding box, wherein the second forwarding box is not included in the network, and wherein the connection request includes a status of the second forwarding box and an identity of the first forwarding box; and
authorize, based on the status of the second forwarding box, the second forwarding box to join the software-defined network, wherein, when authorizing the second forwarding box to join the software-defined network, the processor is further configured to:
 automatically authenticate the second forwarding box based on a relationship between the first forwarding box and the second forwarding box when the first forwarding box is authenticated.

8. The device of claim 7, wherein the response from the first forwarding box includes information identifying a third forwarding box, wherein the third forwarding box is included in the network, and wherein the processor is further configured to:
 forward a second message to the third forwarding box;
 receive a second response from the third forwarding box, wherein the second response includes a status of the third forwarding box; and
 authorize, based on the status of the third forwarding box, the third forwarding box to join the software-defined network.

9. The device of claim 7, wherein, when authorizing the first forwarding box to join the software-defined network, the processor is further configured to:
 determine that the device has available bandwidth to receive communications from the first forwarding box; and
 authorize the first forwarding box to join the software-defined network based on determining that the device has the available bandwidth.

10. The device of claim 7, wherein the processor is further configured to:
 determine a total amount of bandwidth available through the device; and
 allocate a portion of the total amount of bandwidth to the first forwarding box.

11. The device of claim 7, wherein, when authorizing the second forwarding box to join the software-defined network, the processor is further configured to authorize the second forwarding box to join the software-defined network based on functions performed by the second forwarding box.

12. The device of claim 7, wherein, when authorizing the second forwarding box to join the software-defined network, the processor is further configured to authorize the second forwarding box to join the software-defined network when the device is authorized to provide a control signal to the second forwarding box.

13. A non-transitory computer-readable medium configured to store instructions comprising:
 one or more instructions that, when executed by a processor associated with a device, cause the processor to:
 identify a discovery parameter;
 identify a first forwarding box using the discovery parameter, wherein the first forwarding box is included in a network associated with the device;
 forward a message to the first forwarding box, wherein the message requests a response from the first forwarding box;
 receive the response from the first forwarding box, wherein the response includes a status of the first forwarding box;
 authorize, based on the status of the first forwarding box, the first forwarding box to join a software-defined network, wherein the one or more instructions that cause the processor to authorize the first forwarding box to join the software-defined network further comprise one more instructions that cause the processor to:
  authenticate the first forwarding box; and
  authorize the first forwarding box to join the software-defined network based on authenticating the first forwarding box;
 receive, via the first forwarding box, a connection request from a second forwarding box, wherein the second forwarding box is not included in the network, and wherein the connection request includes a status of the second forwarding box and an identity of the first forwarding box; and
 authorize, based on the status of the second forwarding box, the second forwarding box to join the software-defined network, wherein the one or more instructions that cause the processor to authorize the second forwarding box to join the software-defined network further comprise one or more instructions that cause the processor to:
  automatically authenticate the second forwarding box based on a relationship between the first forwarding box and the second forwarding box when the first forwarding box is authenticated.

14. The non-transitory computer-readable medium of claim 13, wherein the response from the first forwarding box includes information identifying a third forwarding box, wherein the third forwarding box is included in the network, and wherein the instructions further comprise one or more instructions that cause the processor to:
 forward a second message to the third forwarding box;
 receive a second response from the third forwarding box, the second response including a status of the third forwarding box; and
 authorize, based on the status of the third forwarding box, the third forwarding box to join the software-defined network.

15. The non-transitory computer-readable medium of claim 13, wherein the one or more instructions that cause the processor to authorize the first forwarding box to join the software-defined network further comprise one more instructions that cause the processor to:
 determine that the device has available bandwidth to receive communications from the first forwarding box; and
 authorize the first forwarding box to join the software-defined network based on determining that the device has the available bandwidth.

16. The non-transitory computer-readable medium of claim 13, wherein the one or more instructions further comprise one more instructions that cause the processor to:
 determine a total amount of bandwidth available through the device; and
 allocate a portion of the total amount of bandwidth to the first forwarding box.

17. The non-transitory computer-readable medium of claim 13, wherein the one or more instructions that cause the processor to authorize the second forwarding box to join the software-defined network further comprise one or more instructions that cause the processor to authorize the second forwarding box to join the software-defined network based on functions performed by the second forwarding box.

18. The non-transitory computer-readable medium of claim 13, wherein the one or more instructions that cause the processor to authorize the second forwarding box to join the software-defined network further comprise one or more instructions that cause the processor to authorize the second forwarding box to join the software-defined network when the device is authorized to provide a control signal to the second forwarding box.

\* \* \* \* \*